June 5, 1945.  N. ERLAND AF KLEEN  2,377,333
ABSORPTION AND ADSORPTION REFRIGERATING APPARATUS
Filed Dec. 22, 1941

INVENTOR.
Nils Erland af Kleen
BY C. P. Goepel
his ATTORNEY

Patented June 5, 1945

2,377,333

UNITED STATES PATENT OFFICE 2,377,333

ABSORPTION AND ADSORPTION REFRIGERATING APPARATUS

Nils Erland af Kleen, Stockholm, Sweden, assignor to Kleen Refrigerator, Inc., Hoboken, N. J., a corporation of Delaware Application December 22, 1941, Serial No. 423,875

5 Claims. (Cl. 62—118)

This invention relates to new and useful improvements in absorption refrigerating apparatus and is directed more particularly to means for insuring that all of the refrigerant liberated from the absorbent in the generating part of the refrigerant circuit is delivered to the condensing part of the circuit.

As a general rule, the generator and condenser of an absorption refrigerating system are located some distance apart from each other and at different levels, the former being usually arranged below the condenser. In passing through the conduit means connecting said parts together, some of the generated refrigerant vapors are condensed before reaching the condenser and return to the generator with the result that additional heat is required to revaporize the same and the efficiency of the refrigerating system is thereby reduced.

It is therefore the primary object of the present invention to overcome the above difficulties and disadvantages in absorption refrigerating systems and to insure that all of the refrigerant liberated from the absorbent in the generating part of the system is delivered to the condensing part by superheating the liberated refrigerant.

The invention consists in subjecting the refrigerant to a source of heat subsequent to its liberation from the absorbent whereby the liberated refrigerant is superheated to insure its delivery to the condenser.

With the above and other objects in view which will appear as the description proceeds, the invention consists in any other novel features hereinafter more fully described, illustrated by way of examples in the accompanying drawing and more particularly pointed out in the appended claims.

Referring to the drawing in which numerals of like character designate similar parts throughout the several views, Figure 1 is a diagrammatic view of the generating, condensing and evaporating parts of an absorption refrigerating system and showing a portion of the conduit means for the passage of the generated refrigerant arranged to be heated directly by the same source of heat as the generator, to superheat the liberated refrigerant.

For simplicity and clarity, the invention will be described in connection with a dry or solid absorption refrigerating system but it is to be understood that the same is equally applicable to adsorption refrigerating systems and, in the following description and claims, the expressions "absorption" and "absorbent" are intended to include "adsorption" and "adsorbent," respectively.

Figure 1:
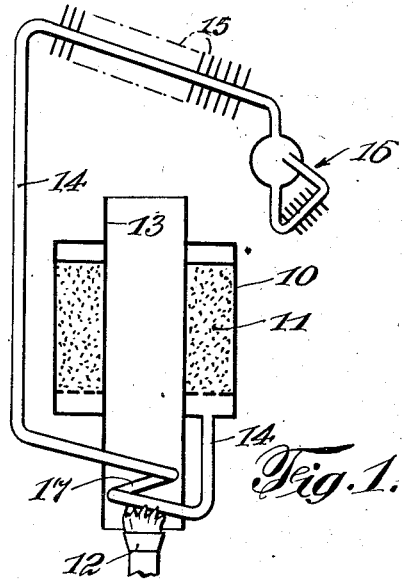

The absorption refrigerating system diagrammatically illustrated in Figure 1 comprises a generator 10 from which the refrigerant is liberated from the absorbent 11 upon application of heat from any suitable source such as a burner 12 or other heating means arranged in a central flue 13 provided in the generator 10. The liberated refrigerant passes through outlet pipe 14 in fluid communication with a condenser 15 and is liquefied in the latter flow by gravity to the evaporator generally indicated as 16.

The condenser 15 is usually located some distance away from the generator 10 and generally is arranged above the level of the latter so that the outlet pipe 14 extends in an upward direction and if some of the liberated refrigerant should condense in said outlet pipe, the efficiency of the system is reduced, for the reason that less than the total amount of refrigerant liberated by the application of heat to the generator is delivered to the condenser. In order to prevent such condensation from occurring in the outlet pipe 14 and to thereby insure that all of the liberated refrigerant shall be delivered to the condenser 15, the outlet pipe is formed with a coil portion 17 disposed within the flue 13 adjacent the burner 12 so that the refrigerant in passing through said coil portion is superheated subsequent to its liberation from the absorbent and prior to being delivered to the condenser. Thus, the refrigerant is positively prevented from condensing in the outlet pipe 14.

Figure 2:
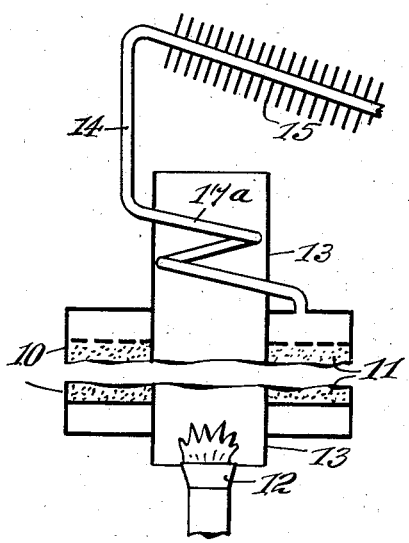
Figure 2 is a similar view of the generating part of the system and showing a slightly different arrangement of the refrigerant conduit means for superheating the liberated refrigerant by the flue gases from the generator burner.

A slightly modified arrangement for superheating the liberated refrigerant is shown in Figure 2 wherein the coil portion 17a of the outlet pipe 14, although disposed within the flue 13, is not subjected to the direct flame from the burner 12 but lies in the path of the flue gases from said burner.

Figure 3:
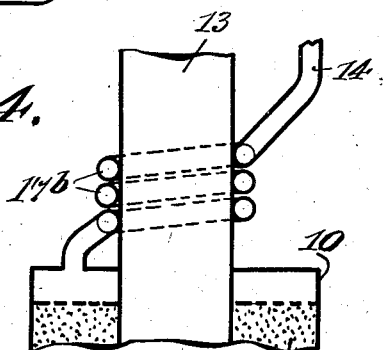
Figure 3 is a view similar to Figure 2 but showing a portion of the refrigerant conduit arranged in heat exchange relation with the heating flue of the generator.

Another arrangement for superheating the liberated refrigerant illustrated in Figure 3 wherein the coil portion 17b of the outlet pipe 14 is wound about the outer periphery of the flue 13 and in heat exchange relation therewith so that the heat is transmitted from the flue to the coil 17b to super-heat the refrigerant.

Figure 4:
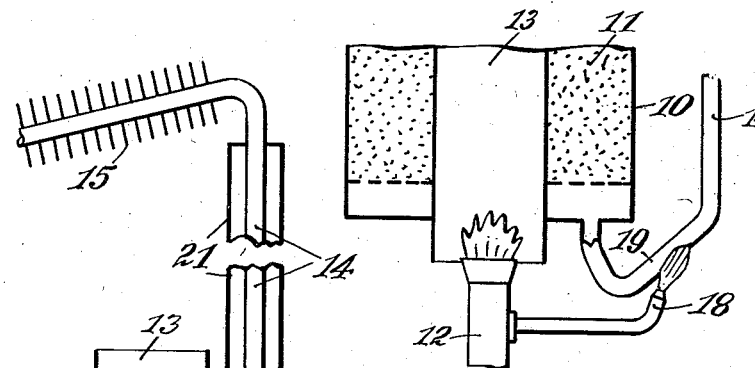
Figure 4 is a diagrammatic view of the generating part of the system and showing a portion of the refrigerant conduit arranged to be heated by an auxiliary heating source.

Instead of employing the same source of heat to liberate the refrigerant from the absorbent and to superheat the liberated refrigerant, separate heating means may be employed. For example, as shown in Figure 4, an auxiliary burner 18 is arranged to supply the necessary amount of superheat to the liberated refrigerant flowing through a bend 19 in the outlet pipe 14.

While I have shown and described the superheater 17, 17a, 17b and 19 as being arranged outside the generator 10, obviously the same may be disposed inside said generator.

Figure 5:
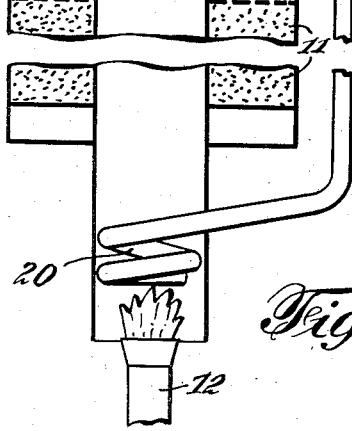
Figure 5 is a similar view in which the refrigerant conduit is heated by an indirect heating system, the vaporizing portion of which is arranged to be heated directly by the source of heat for the generator.

Still another method and apparatus for superheating the liberated refrigerant in accordance with the present invention is illustrated in Figure 5 in which an indirect heating system is employed containing a relatively small amount of vaporizable medium, said indirect heating system including a vaporizing portion 20 and a condensing portion 21. The vaporizing portion 20 is adapted to be heated by any suitable means such as the burner 12 for the generator 10, or a separate heating source, and the condensing portion 21 of the system is arranged in heat exchange relation with the outlet pipe 14. In Figure 5, the condensing portion 21 is shown in the form of a jacket surrounding the pipe 14 but obviously the same can be in the form of a coil surrounding said outlet pipe, or a conduit extending parallel to said outlet pipe and in heat exchange relation therewith.

It will thus be seen that in accordance with the present invention, the liberated refrigerant is superheated either directly or indirectly by the same source of heat employed to liberate the refrigerant, or by a separate source of heat.

From the foregoing it is believed that the construction and advantages of my invention may be readily understood by those skilled in the art without further description, it being borne in mind that numerous changes may be made in the details disclosed without departing from the spirit of the invention as set out in the following claims.

What I claim and desire to secure by Letters Patent is:

1. In absorption refrigerating apparatus operating with solid absorbent material, in combination, a generator formed with a central flue, heating means arranged in said flue, a condenser, and conduit means connecting said generator and condenser for the passage of refrigerant generated in said generator, said conduit having a portion arranged in thermal contact with said flue whereby to prevent condensation of vapors in their passage from the generator to the condenser and return of condensate to said generator.

2. In absorption refrigerating apparatus of the type operating with a refrigeration fluid in conjunction with solid absorbent material and including a generator, heating means for said generator, and a condenser arranged at a higher level than said generator; the combination of a conduit interconnecting said generator and said condenser for the passage of vapors, said conduit having a coil portion adjacent its connection with said generator arranged to be heated by said heating means to prevent condensation of vapors in their passage from the generator to the condenser and return of condensate to the generator.

3. In absorption refrigerating apparatus of the type operating with a refrigeration fluid in conjunction with solid absorbent material, a generator formed with an absorbent chamber and a heating flue, a burner in said heating flue to heat said absorbent chamber, a condenser arranged at a higher level than said generator, and a conduit interconnecting said absorbent chamber and said condenser for the passage of vapors and having a coil portion adjacent its connection with said absorbent chamber arranged in said flue and heated by said burner to prevent condensation of vapors in their passage from the absorbent chamber to the condenser and return of condensate to said chamber.

4. In absorption refrigerating apparatus of the type operating with a refrigeration fluid in conjunction with solid absorbent material, a generator formed with an annular absorbent chamber and a central heating flue, a burner in the lower portion of said flue to heat said absorbent chamber, a condenser, and a conduit interconnecting said absorbent chamber and said condenser for the passage of vapors, said conduit having a portion adjacent its connection with said absorbent chamber arranged in the upper portion of said flue in the path of the hot gases from said burner to prevent condensation of vapors in their passage from the absorbent chamber to the condenser and return of condensate to said chamber.

5. In absorption refrigerating apparatus of the type operating with a refrigeration fluid in conjunction with solid absorbent material, a generator formed with an annular absorbent chamber and a central heating flue, a condenser, a burner in the lower portion of said flue to heat said absorbent chamber, and a conduit interconnecting said condenser and the lower portion of said absorbent chamber for the passage of vapors said conduit having a portion adjacent its connection with the absorbent chamber arranged in the lower portion of said flue immediately above said burner to prevent condensation of vapors in the passage from the absorbent chamber to the condenser and return of condensate to said chamber.

NILS ERLAND AF KLEEN.